United States Patent [19]

Olimpio

[11] Patent Number: 4,751,156
[45] Date of Patent: Jun. 14, 1988

[54] CAP FOR ACCUMULATOR ELEMENTS WITH DEVICE FOR AUTOMATIC FILLING

[76] Inventor: Stocchiero Olimpio, 4 Via Kenendy, 36050 Montorso Vicentino, Italy

[21] Appl. No.: 8,161

[22] Filed: Jan. 29, 1987

[30] Foreign Application Priority Data

Jan. 29, 1986 [IT] Italy ............................. 85509 A/86

[51] Int. Cl.⁴ ...................... H01M 2/36; H01M 10/48
[52] U.S. Cl. ......................................... 429/64; 429/91; 429/76; 137/260; 141/205
[58] Field of Search ........................... 429/64, 76, 91; 137/260; 141/205

[56] References Cited

U.S. PATENT DOCUMENTS

| | | | |
|---|---|---|---|
| 1,268,947 | 6/1918 | Fell | 141/205 |
| 1,403,041 | 1/1922 | Lawson | 137/260 |
| 1,530,430 | 5/1922 | Skelton . | |
| 1,703,233 | 2/1929 | Hall et al. | 429/91 |
| 1,942,908 | 1/1934 | Swain et al. | 429/76 |
| 2,872,500 | 2/1959 | Rowls . | |
| 4,386,141 | 5/1983 | Weidner et al. | 429/64 |

FOREIGN PATENT DOCUMENTS

| | | |
|---|---|---|
| 3127619 | 1/1984 | Fed. Rep. of Germany . |
| 385029 | 4/1908 | France . |
| 2304014 | 10/1976 | France . |
| 2439921 | 5/1980 | France . |
| 2492868 | 4/1982 | France . |
| 8300260 | 1/1983 | World Int. Prop. O. . |

Primary Examiner—Donald L. Walton
Attorney, Agent, or Firm—Birch, Stewart, Kolasch & Birch

[57] ABSTRACT

A cap (10) for accumulators suited for the automatic refill of distilled water includes a main body (20) inside which there is a chamber (13) suited for the distribution of the distilled water through a hole (14). The hole is shut by a valve (32) controlled by a float (30) and connected to the float by means of a toggle joint. The toggle joint consists of a right-angled lever (35) and of a shaft (34) connected by a hinge to the lever and to the valve. The toggle joint ensures a very high force for the shutting of the valve, such as to stand high deliveries of liquid even under pressure. The cap is also equipped with a float (30) in the shape of an upside-down glass, that is, open at the bottom on the side of the liquid upper surface, so that the push on the float is determined by the over-pressure of the air and the gasses contained in the interior of the float. The overpressure increases in direct relation to the rising of the electrolyte level. The gasses which develope inside the accumulator are discharged through a cap (40) equipped with radial holes (5) and with a ceramic filter suited to the expansion of the gasses.

10 Claims, 2 Drawing Sheets

CAP FOR ACCUMULATOR ELEMENTS WITH DEVICE FOR AUTOMATIC FILLING

BACKGROUND OF THE INVENTION

1. Field of the Invention

The invention concerns a cap for accumulator elements with a device for the automatic refill of the water, where the cap is inserted into said elements, it is connected by means of pipe joints to a circuit for water refilling and it presents a float opening and closing a valve in said device.

2. Description of Background Art

It is known that accumulator batteries, particularly vehicle batteries, during their operation lose part of the water being diluted in the sulfuric acid solution. This fact leads to the lowering of the electrolyte level in the elements of the accumulator and to a variation in the density of the electrolyte, so that it becomes necessary to add water in order to prevent the lowering of the electrolyte level from causing the deterioration of the accumulator together with a lowering of the energy performance of the same.

For this reason, systems for the automatic refilling of distilled water into the accumulator battery elements are becoming more and more popular. They foresee a feeding tank connected by means of pipes to the refilling caps which are interconnected with each other, each of them being provided with openings for the water inlet and outlet and with pipe joints which connect them together.

When, by means of the refilling, the necessary level of electrolyte has been reached in each element, the float shut the valve being present in the cap.

Several caps for battery elements complete with float are known.

A known type of cap foresees that the shaft supporting the valve is vertical and in line with the stick supporting the float.

A disadvantage presented by said solution consists in the fact that the shutting force of the valve is equal to the hydraulic push which is impressed on the float by the electrolyte, namely a rather weak force which can not prevent the valve from opening again, particularly while it is in operation.

In another device, described in patent DE No. 3127619, the float is connected to a re-inforcing lever, the end of which is also connected to a shaft presenting in its center a cogged segment in a cavity of the stem of the valve body.

Thus it is obtained that the transmission ratio from the float guiding shaft to re-inforcing lever corresponds to 1:16. Even though this shutting device grants the shutting of the valve thanks to the multiplication of the hydraulic push of the float conveying a sufficient force, this device appears rather complicated because of the presence of the cogged shaft which intervenes between an arm of the lever and the valve stick.

For this reason this device is rather costly.

It is necessary to point out also, that a characteristic being common to all the known devices with a float is that the float consists of a practically cylindrical, hollow container, which is sealed by soldering or gluing, so that it remains light in order to exploit as much as possible the hydraulic pushing force, when it is immerged.

If and when the seal of the float breaks and, therefore, the electrolyte enters inside the float, the penetration of the liquid obliterates the hydraulic push on the float, thereby causing the inconvenience that the valve stays open even when the level of the liquid is higher than desired.

SUMMARY AND OBJECTS OF THE INVENTION

The purpose of this invention is that of overcoming the just mentioned disadvantages. More particularly, the purpose is that of obtaining that the shutting force impressed by the valve by multiplied in relation to the push impressed by the float by such a factor, that the valve can easily work even with pressure re-filling systems and for rather high deliveries at the outlet of the discharge opening. Yet another purpose is that of obtaining that the working of the float does not depend principally on the hydraulic push impressed by the electrolyte on the float itself, but that it depends mainly on the push impressed by air and gas under pressure in the float, they being compressed inside the same due to the effect of the increase in the level of the electrolyte.

These and other purposes, which will be better described hereafter, are obtained by a cap for accumulator elements which, in accordance with the claims, includes an almost cylindrical upper part having two pipe joints and being suitable to receive the distilled water coming from an external tank, having in its central part a pipe for the inspection of the electrolyte, and being characterized by the fact that the water outlet opening is shut by a bevelled valve, the stem of which is connected with the shaft supporting a float by means of a mechanical ball and socket joint.

According to the invention, the vertical shaft of the float is conveniently connected with a slot-connection to an angled lever having its fulcrum in the corner of the right angle. Said lever has its other end hinged with another shaft connecting it to the stem of the valve, which is forced to slide in a vertical seat. When the float reaches the maximum level, the right-angled lever arranges itself with the side connected to the float practically horizontal, while the ball and socket joint is closed and it develops its maximum force exactly in correspondence with the last segment, which corresponds to the lever approaching a closure of zero degrees in relation to the horizontal line.

Moreover, the invention foresees the float not to be a closed and hollow solid, but, instead, the float according to the present invention is shaped as an upside-down glass, that is,having preferably, but not necessarily,a cylindrical shape without a lower bottom and with a closed top surface, so that the push on the float is caused by the compression of the air and the gasses which are trapped inside the float itself when the level of the liquid increases.

Another characteristic of the cap of the invention foresees that the gasses developing inside the accumulator element be brought outside through some grooves being present between the central body of the cap and the little pipe or tube supporting the float, which is also used for inspecting the electrolyte. When the gasses reach the upper part of the cap,which is insulated from the area where the distilled water is present, they go through a ceramic filter placed on the lid of the cap and then they exit through some radial slots being present on the lid and meant for that purpose.

Moreover, should this filter be clogged, another outlet guarantees the discharge of the gasses. Said outlet consists of the space being left free in the walls of a central opening in the filter by the stem of the electrolyte level indicator.

One of the advantages obtained with the cap of the invention is the fact that such cap can be used both with the systems which carry out the re-filling with distilled water at environment pressure and with the systems which carry out the re-filling with distilled water under pressure. This ability of the present invention is due to the valve shutting force obtained with the toggle joint is, at least theoretically, endlessly multiplied in relation to the push of the float. From a practical standpoint, a multiplication coefficient equal to 36 times has been obtained by pulling back the toggle joint by two degrees in relation to the maximum closing point.

A consequence resulting from the possibility to refill at environmental pressure is the fact that the re-filling can take place continuously, for instance in the case of vehicle batteries. This is done by placing in the vehicle a distilled water container being permanently connected through some pipes with the caps of the individual battery elements which are interconnected.

Another advantage ensuing from the toggle joint closure of the valve of said cap is represented by the fact that the opening for the water flow can be sufficiently large, at least 2.5 to 3 mm in diameter. Thus, the size of the opening avoids any danger of clogging due to the settling of particles in suspension. In fact the available closing force of the valve is sufficient to oppose a relatively high delivery of liquid, even if the later is under pressure. Moreover, a relatively high water flow involves a good flush of the hinges being connected to the levers of the toggle joint, so that a good performance of the cap device is always granted.

Yet another advantage consists in the fact that the float used with the cap being the object of the invention, always being shaped as an upside-down glass, cannot break down in the same way as do the floats that are hollow inside and exploit the hydrostatic push of the electrolyte.

In fact, the float having the shape of an upside-down glass keeps itself in balance on the surface of the electrolyte as a consequence of the push impressed by the gasses and the air comprised between the free surface of the electrolyte and the inside walls of the float.

Another relevant advantage is presented by the fact that, at least two outlets are foreseen for the gas, both through the filter and through the electrolyte level indicating tube which is free to move at the center of the filter. The cap, one object of the invention gives the maximum security by ensuring the discharge of the gas under any working condition.

BRIEF DESCRIPTION OF THE DRAWINGS

Other characteristics and advantages of the invention will be better understood from the description of a preferred form of execution, which is given here by way of example only and which is not meant to limit the scope of the invention and is illustrated in the enclosed tables of drawing, where.

DETAILED DESCRIPTION OF THE INVENTION

Figure 1:
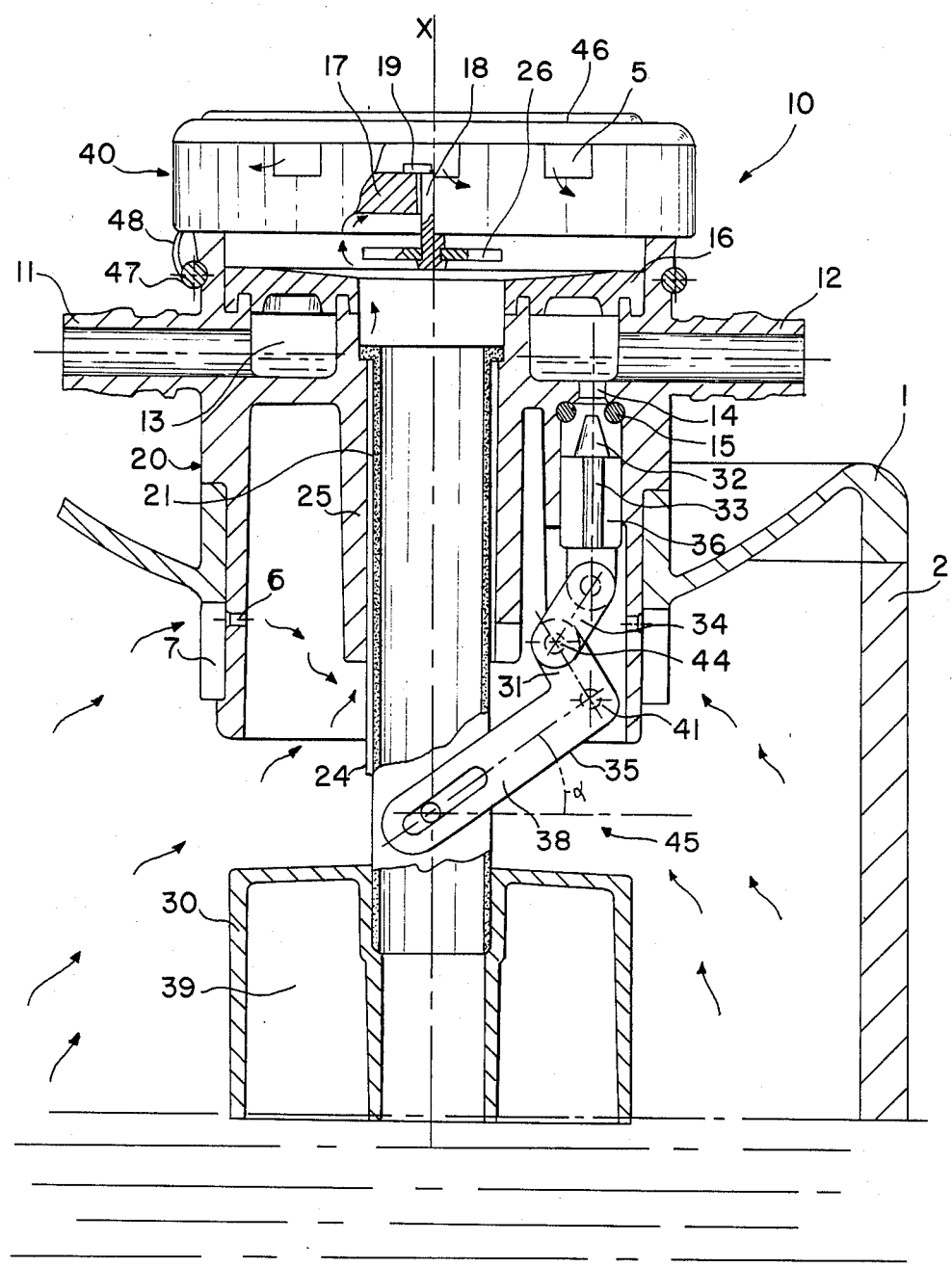
FIG. 1 is a vertical section of the cap mounted on an accumulator element and showing the float which keeps the valve open during the re-filling operation.

With reference to the mentioned drawings, the cap, indicated as a whole by numeral 10, is inserted into the opening of lid 1 of a container for accumulators.

The cap 10, entirely built of plastic material, consists of a main body 20, a float 30 being connected with the main body 20 by means of a central sliding tube 21, and a toggle joint system hinged to the central sliding tube 21 for closing the valve. Said system opens and closes the opening through which the distilled water for the re-filling of the electrolyte flows. The top of the cap is closed by a lid 40.

The main body 10 of the cap presents two pipe joints 11 and 12. The distilled water, delivered by a pipe system not represented in the drawing, flows in through pipe joint 11. The pipe system is connected to a tank or to the outlet of another cap placed before cap 10. The distilled water is collected in the ring-shaped chamber 13, which has an opening 14 at its bottom, and it flows out through pipe joint 12, which is connected by means of a pipe system to another pipe joint belonging to another cap, or it flows back to the feeding tank.

When float 30 is in its lower position, as represented in FIG. 1, the bevelled head of valve 32 is also lowered and not in contact with the OR-ring 15, since stem 33 of said valve is connected to float 30 by means of the hinged shaft 34 and lever 35.

It can now be observed that valve 32 can only slide vertically, it being guided in this movement by the radial fins 36 being present on the valve stem 33. Fulcrum 41 of right-angled lever 35 is positioned in relation to the vertical axis of valve 32. The short arm 37 of lever 35 is connected to the hinged shaft 34 by means of a hinge, while the long arm 38 ends with a fork in which two slots 42 and 43 are obtained.

Figure 3:
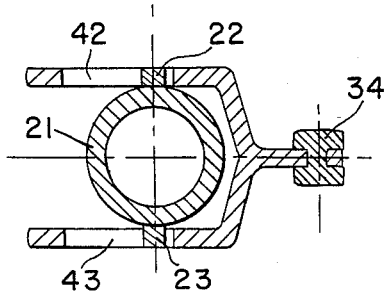
FIG. 3 is a cross section along line III—III of FIG. 2, showing the "L"-shaped lever of the toggle joint with the float.

As can be observed in FIG. 3, said slots are connected with two pivots 22 and 23 moulded on the central tube 21.

Since tube 21 carrying float 30 can also move only vertically, it being guided in its seat by the radial fins 24, it follows, as a consequence, that the push impressed on the float by the air and the gasses contained in the ring-shaped chamber 39, and being in relation to the pressure increase resulting from the uprising of the electrolyte level, is transmitted to lever 35 by means of the pivots 22 and 23 and, therefore, always in the direction coinciding with the geometrical axis x of the sliding tube 21.

As a consequence of the factors explained above, the directions of the pushing force of the float and of the force impressed on the stem of valve 32 are fixed under all working conditions. For this reason, and as a consequence of the fact that the transmission of the push $F_1$ of the float to the valve occurs through lever 35 and the hinged shaft 34, it can be seen that the pushing force $F_2$ of the valve is in relation to force $F_1$ according to the formula: $F_2 = F_1 \cdot A/B \cdot \sin \alpha$, where A indicates the distance between fulcrum 41 of level 35 and the straight line x, which represents the direction of application of force $F_1$, B is the distance between fulcrum 41 and hinge 44, positioned on the short arm of lever 35, and $a$ is the angle formed by arm 38 of lever 35 with the horizontal line.

From the above illustrated formula, it can be understood that the closer the angles nears zero, that is the float rises and arms 38 of lever 35 arranges itself horizontally, force $F_2$, exerted on the valve, increases very rapidly and reaches very high values for sufficiently small α angles.

For instance, it has been observed that, given a construction of the cap foreseeing an A distance equal to about 13.5 mm. and a B distance of the shorter arm 37 of lever 35 equal to about 5.4 mm., establishing that the bevelled tip of valve 32 closes on the OR-ring 15, when the angle α is of about 2°, the multiplication factor between force $F_1$ of the float and $F_2$ exerted on the closed valve equals 36. It can, therefore, be understood that, by having available a closing force thus multiplied, cap 10 is suited to be used with the most varied systems of re-filling, that is both those with distilled water at environmental pressure, and those systems which foresee the re-filling with liquid under pressure.

In order to satisfy this latter working condition, the ring-shaped chamber 13 collecting the distilled water coming from pipe joint 11 and exiting through pipe joint 12, is equipped at the top with a seal 16 made of plastic material, which creates a sealed chamber suited to receive distilled water under pressure.

Always because of the high force closing the valve, it is possible to have a sufficiently large opening 14 for the outlet of the distilled water, for instance 2.5 to 3 mm. in diameter. This fact grants an opening free of dirt and, therefore, always working. Besides, by having an abundant delivery of liquid, the problems concerning the cleanliness of the moving components of the cap, such as, for instance, the hinges connecting float 30 with the right-angled lever 35, fulcrum 41 of the lever, or the hinges of the hinged shaft 34, are practically non-existent.

In fact, the water flowing abundantly during the re-fill constantly flushes said components, thereby preventing dirt from accumulating.

As it has been previously said, it is necessary that the gasses developed by the electrolyte during the working process of the accumulator always find a safe outlet in order to avoid the deformation or the destruction of the accumulator due to overpressures inside the accumulator.

For this reason, the cap foresees different outlets for the discharge of the gasses toward the outside of the accumulator.

A first outlet for the discharge of the gasses through the cap is obtained by letting the gasses go through the fins 24 of the sliding tube 21 and the inside wall 25 of the cap central part; after they have reached chamber 3, they go through filter 17 and thereafter they enter into chamber 4, inside lid 40. Chamber 4 is equipped with circumferential openings 5 which discharge the gasses outside.

The gasses reach the interspaces between the fins 24 and the inside part 25 of the cap through two different passages, that is, through the ring-shaped space 45, created in the area comprised between the main body 20 of the cap and float 30, and also through the radial openings 6 being in communication with the inside chamber of the accumulator thanks to two incisions 7 being present in the lower central area of lid 1.

The gasses reaching chamber 3, can go not only through filter 17, but they can also exit through the space left by the gap between the stem of the level indicator 18 and the hole being present in the center of the ceramic filter 17, the diameter of which is larger than the stem.

Thus it can be observed that, even in the hypothesis that the filter gets clogged, the gasses still find an outlet.

Figure 2:
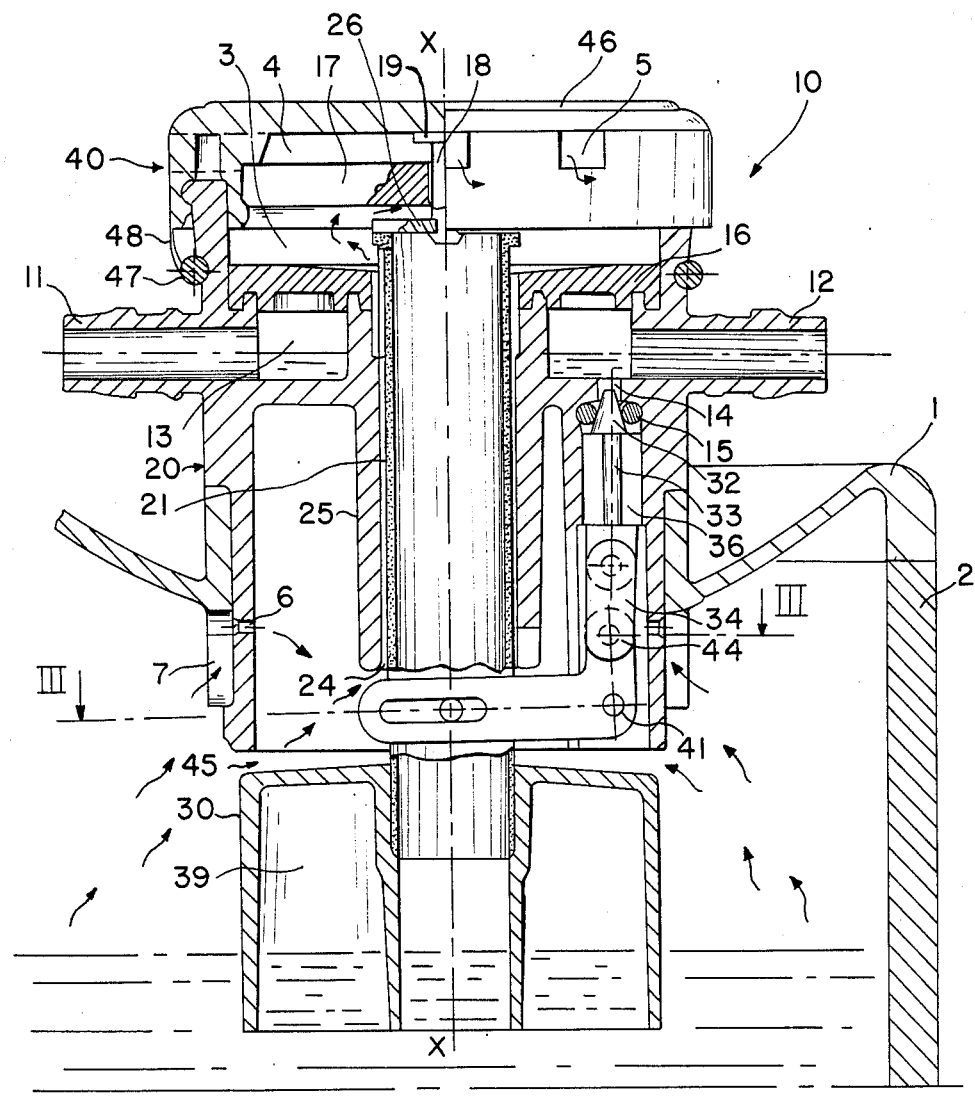
FIG. 2 is a vertical section of the cap showing the closed valve with the float displaced upwards.

As can be observed in FIG. 1, when the float is low, since the support of the terminal part of tube 21 on the perforated disc 26 lacks—said disc being pressure mounted on the stem of the level indicator 18—it happens that said level indicator 18 rests with its head 19 on the pad of filter 17. On the other hand, as in the case represented in FIG. 2, float 30 is up and the valve is closed, tube 21 carrying the float is in its highest position and the perforated disc 26 rests on its edge, so that head 19 of the level indicator 18 is as high as it can be.

It can, therefore, be understood that, if the upper surface 46 of lid 40 is made of transparent plastic material, by observing the position of head 19 it is possible to check the level of the electrolyte being present in the element into which the cap is inserted.

Finally it is observed that lid 40 is connected with body 20 of the cap by means of an elastic ring 47 mountable in a semi-circular impression obtained on body 20 of the cap. The elastic ring 47 is connected to lid 40 by means of a tongue 48, also made of plastic material.

By opening lid 40, it is possible to measure through tube 21 the density of the electrolyte contained in the accumulator.

It is pointed out that, during the construction process of the cap being the object of the present invention, several modifications can be made, which are still inspired to the described inventive idea and which, therefore, do not exceed the scope of the patent rights as they are expressed in the following claims.

I claim:

1. A cap for accumulators comprising:
   a main body (20) inserted into a seating hole in a cover of an accumulator element;
   at least two pipe joints (11, 12) operatively connected for re-filling of distilled water to the accumulator element;
   a lid (40);
   a chamber (13) for distributing said water;
   a valve (32) for selectively permitting water to flow from said chamber into said accumulator element;
   a float (30) connected with the valve (32) for opening and closing said valve to selectively permit said water to flow from said chamber into said accumulator element, said float (30) controls the opening and closing of the valve (32) by means of a toggle joint.

2. A cap according to claim 1, characterized by the fact that the toggle joint connection between the valve (32) and the float (30) includes a right-angle lever (35) having its fulcrum (41) placed in relation to the right angle corner, where a longer part (38) of said lever is connected to the sliding tube (21) carrying the float (30) by means of slots (42, 43) and a shorter part (37) is connected by means of a hinge (44) to a hinged shaft (34) which is also connected by a hinge to the stem (33) of the valve (32), which is forced to slide in a vertical seat.

3. A cap according to claim 2, characterized by the fact that the vertical axis of the valve (32) and the fulcrum (41) of the right-angled lever (35) are aligned.

4. A cap according to claim 1, characterized by the fact that the float (30) receives a push from the bottom upwards when the electrolyte, rising in level, compresses the air and gasses contained in the chamber (39), being circumscribed at the top and laterally by the float (30) and at the bottom by the upper surface of the electrolyte liquid.

5. A cap according to claim 2, characterized by the fact that the multiplication factor of the pushing force from the float to the valve is higher than 30, when the axis of the longer arm (38) of the right-angled lever (35) is tilted by an angle of less than 3° in relation to the horizontal line.

6. A cap according to claim 1, characterized by the fact that the chamber (13), collecting the water for re-fill, is circumscribed at the top by a seal (16), made of plastic material, for creating a chamber suited to receive water under pressure.

7. A cap according to claim 1, characterized by the fact that the gasses contained inside the accumulator are discharged outside by going first through an empty space being present between fins (24) of a tube (21) supporting the float (30), then through a filter (17) placed on the lid (40) of the cap (10) and finally exiting through some holes (5) being present on the lid of the cap itself.

8. A cap according to claim 7, characterized by the fact that another outlet for the discharge of the gasses is provided by a space existing between a stem of an indicator (18) and a seating hole of the indicator on the filter (17).

9. A cap according to claim 1, characterized by the fact that it is equipped with a level indicator (18) consisting of a stem being guided in a central hole of a filter (17) being present on the lid of the cap (10), of a head (19) and of a disc (26) resting on the upper edge of the sliding tube (21) supporting the float.

10. A cap according to claim 1, characterized by the fact that the lid (40) is connected with the cap (10) by means of an elastic ring (47) being connected to the lid by a tongue (48), said lid being equipped with radial holes for the discharge of the electrolyte and holding in its interior a filter for said gasses.

* * * * *